Sept. 11, 1951            L. L. MORSE            2,567,229
APPARATUS FOR MEASUREMENT OF TIME
INTERVALS BETWEEN PULSES
Filed May 16, 1947
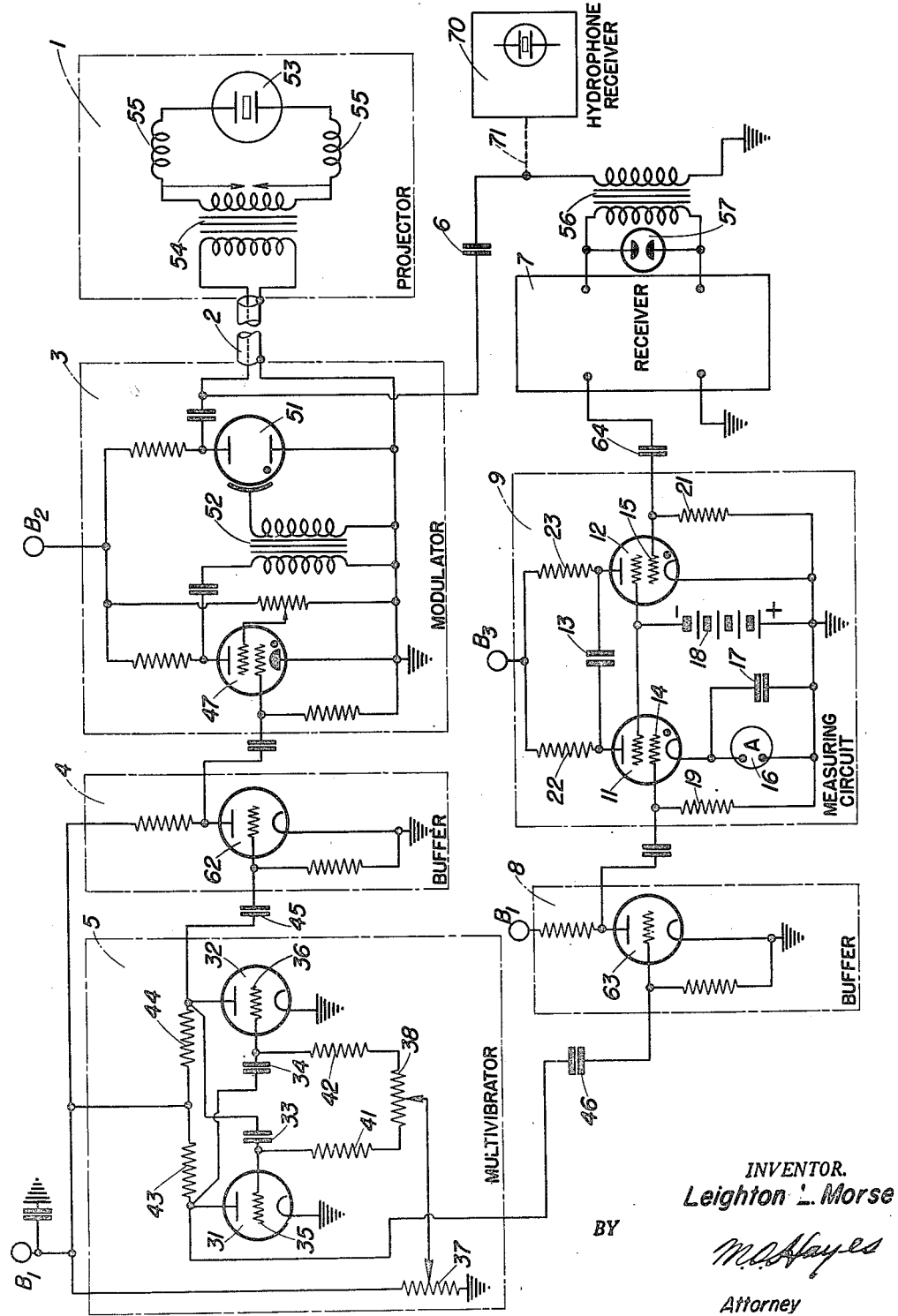
INVENTOR.
Leighton L. Morse
BY
M. O. Hayes
Attorney Patented Sept. 11, 1951

2,567,229

UNITED STATES PATENT OFFICE 2,567,229

APPARATUS FOR MEASUREMENT OF TIME INTERVALS BETWEEN PULSES

Leighton L. Morse, San Diego, Calif.

Application May 16, 1947, Serial No. 748,642

4 Claims. (Cl. 177—386)

(Granted under the act of March 3, 1883, as amended April 30, 1928; 370 O. G. 757)

This invention relates to apparatus for precision measurement of the time interval between two spaced pulses of energy, and has particular application to echo ranging apparatus where pulses are periodically transmitted and the echoes received, the time interval between the transmission of a pulse and the return of its echo being a measure of the distance from the transmitter to the object which sends back the echo.

It is an object of this invention to provide a circuit for measuring with precision and accuracy the time interval between spaced pulses.

It is another object of this invention to provide a circuit for indicating accurately small changes in distance between an echo ranging transmitter and a reflecting target, which changes occur constantly.

It is a specific object of this invention to provide means for indicating with precision and accuracy the manner in which waves rise and fall on the surface of a body of water.

Echo ranging apparatus is known in which pulses of energy are transmitted, reflected by a target, and returned to the source. The time interval between transmission of pulse and return of echo is a measure of the target distance or range. When apparatus of this character is placed on the bed of a body of water, and energy pulses of sonic or supersonic frequency are directed upward, the change in impedance of the sonic path at the surface of the water causes an appreciable reflection which returns to the apparatus on the bottom in the form of an echo pulse. Measuring means may be provided for indicating the time interval between the pulses and their corresponding echoes. By recording the indications, a continuous record of the water depth may be made.

For changes in depth which are large compared to the total depth, the apparatus described immediately above may suffice. However, when it is desired to indicate the motion of waves on the water surface by this method, the percentage change in indication resulting from rise and fall of the waves is so small with respect to the total depth being measured that its detection by an indicating device is without precision.

It is accordingly an object of this invention to provide apparatus which may be used to indicate with accuracy and precision slight changes in water depth due to waves.

In accordance with this invention, there is provided a circuit which may be employed with apparatus adapted for lowering to the bed of a body of water. This circuit periodically transmits upwardly echo ranging pulses, which are reflected downward upon hitting the surface and which then return to a receiver embodied in the apparatus. In the circuit is provided a delay means which is energized in response to each transmitted pulse and which delivers an output pulse an accurately predetermined time after the transmission of each echo ranging pulse. A measuring circuit is connected to the output of this delay means and to the output of the receiver, so as to indicate the time interval between the delayed pulse and the echo pulse. In this way a slight change in target range, such as would occur with the rise and fall of waves, produces a large percentage change in the interval measured by the measuring circuit, rather than a small percentage change which would result were the delay circuit not used.

Means are provided for permitting employment of a high current meter for measuring the wave swells instead of a sensitive meter which would normally be required, said means assuming the form of a flip-flop circuit utilizing a pair of gas-filled, high current tubes. The flip-flop circuit is actuated by the delayed echo ranging pulse and by the echo pulse received by the receiver, so that the gas-filled tubes are abruptly turned on and off in response to the pulses received. An insensitive meter is placed in series with one of the tubes for indicating when that tube is conducting.

The delay means of this circuit is in the form of a free-running multivibrator, which also serves to generate the transmission pulses, the delayed pulses being derived when the multivibrator flips back in the second half of its cycle.

For a detailed understanding of this invention, reference is now made to the drawing, wherein 1 designates a supersonic transmitter-receiver known as a projector. The projector is adapted to be lowered to the bed of a water body, connection being made thereto by a coaxial cable 2 which communicates with the rest of the apparatus located above the surface of the water. The projector 1 is energized by a modulator 3 which is triggered through a buffer stage 4 from the right hand tube of a multivibrator 5. Echo pulses returning to the projector 1 are transmitted up the cable 2 and through a capacitor 6 to a suitable receiver 7. Pulses which are delayed with respect to the trigger pulses are taken from the left hand tube of the multivibrator 5 and applied through a buffer stage 8 to one terminal of a measuring circuit 9, the other terminal of which is connected to the receiver 7.

During a cycle of operation, a transmission pulse is first generated by the multivibrator 5 and emanated from the projector 1. At a controllably predetermined time thereafter, a pulse is taken from the left hand tube of multivibrator 5 and applied to the measuring circuit 9. Still later in the cycle the echo from the transmission pulse is returned through projector 1 to the receiver 7 and is likewise fed to the measuring circuit 9. It is the function of the measuring circuit 9 to measure the time interval between the delayed pulse from the left hand tube of multivibrator 5 and the echo pulse from the receiver 7.

To this end the measuring circuit 9 comprises a pair of gas filled tubes, such as thyratrons 11 and 12, connected to form a flip-flop circuit. Such a circuit has the characteristic of permitting one of the two tubes to conduct as long as the other is undisturbed. Upon initiation of conduction in the other tube, by positively energizing its grid, conduction is transferred to said other tube and is blocked in the first tube by dropping the plate voltage on the first tube. This drop in plate voltage is effected through a capacitor 13 directly connected between the plates of the tubes 11 and 12. The reverse action occurs when the first tube is rendered conductive by positively energizing its grid.

In the measuring circuit 9 the grid 14 of tube 11 is energized by the delayed pulse from multivibrator 5, while the grid 15 of tube 12 is energized by the echo pulse from receiver 7. An ammeter 16 is placed in the cathode circuit of the tube 11 and serves to indicate when that tube is conductive. In a preferred embodiment of this invention, the ammeter 16 is in the form of a recording instrument in which a roll of recording paper is slowly drawn past an inked needle movable in response to the ammeter reading, whereby a continuous time record of the ammeter reading may be obtained. A shunting capacitor 17 bridges ammeter 16 so as to smooth out the fluctuating current and permit an average reading to be obtained. The screen grids of tubes 11 and 12 are maintained at a suitable negative potential by a battery 18. The grids 14 and 15 are connected to ground through grid resistors 19 and 21, respectively. The cathodes of tubes 11 and 12 are likewise tied to ground, the former through the ammeter 16 as mentioned above. The plates of tubes 11 and 12 are connected through plate resistors 22 and 23, respectively, to a suitable source of plate potential $B_3$.

Multivibrator 5 comprises a pair of tubes 31 and 32 having grid-to-plate cross connections through capacitors 33 and 34, respectively. The grids 35 and 36 of the respective multivibrator tubes 31 and 32 are returned to a biasing potentiometer 37 through a variable common resistor 38, the movable center tap of which is connected to the slider of potentiometer 37 as shown. In addition, the circuits of grids 35 and 36 include series grid resistors 41 and 42, respectively. The plates of multivibrator tubes 31 and 32 are connected to a suitable source of plate potential $B_1$ through plate resistors 43 and 44, respectively.

The tubes 31 and 32 are thus connected to form a free-running multivibrator which generates a square wave on the plate of each tube. When the voltage rises on one plate it drops on the other, and vice versa. The periodicity of the multivibrator 5, i. e., the time required to effect a complete cycle, is determined by the grid return potential which is in turn determined by the setting of potentiometer 37 connected between $B_1$ and ground. The proper setting of potentiometer 37 is determined by the maximum depth of the water into which the projector 1 is lowered, inasmuch as the spacing between transmitted pulses must be at least great enough to allow the echo to be received before transmission of the next succeeding pulse. The proportions of conducting time shared by the two tubes 31 and 32 are determined by the RC values of the grid circuits. Since the capacitors 33 and 34 are fixed, the RC values are determined by the resistor 38, the slider of which is effective to increase the resistance is one grid circuit while simultaneously decreasing the resistance in the other grid circuit.

There is thus produced, during each cycle, on the plate of tube 32, an abrupt drop in voltage, which triggers the modulator 3 through a differentiating capacitor 45, and the buffer 4, and results in the transmission of a pulse from projector 1. In the interval between transmitted pulses, when the multivibrator flips back, a dropping voltage appears on the plate of tube 31 which is differentiated in capacitor 46 and applied through buffer 8 to the measuring circuit 9. It will be understood that the voltage rises which appear on the plates of tubes 31 and 32 have no effect on the measuring circuit 9 and modulator 3, respectively, since they constitute negative voltages applied to the tubes 11 and 47, respectively, which tubes are already non-conducting at the time of application of these pulses.

The modulator 3 comprises a strobotron 47 triggered by the buffer 4, which in turn triggers a mercury vapor tube 51, through a transformer 52. The tube 51 applies the modulating pulse to the projector 1 through the coaxial cable 2. In many cases the mercury vapor tube 51 is not needed, and it may be dispensed with, allowing the projector 1 to be triggered directly from the strobotron 47.

The projector 1 consists of a crystal projector 53, which is shock excited by the modulating pulse from modulator 3, through a transformer 54 and tuning inductances 55. For each modulating pulse received, crystal projector 53 sends forth an envelope of supersonic vibrations which travel upwardly to the surface of the water, where they are partially reflected and returned to the projector 1. The crystal projector 53 also acts as a receiver for transmitting the energy of each pulse upwardly through the cable 2, where it is diverted through capacitor 6 and transformer 56 to the receiver 7. Inasmuch as receiver 7 also receives the original transmitted pulse, a gas tube 57 is applied across its input terminals to break down upon receiving excess voltage and thereby protect the receiver by mismatching the receiver impedance.

*Operation*

The operation of the apparatus described above is as follows. Assume that tube 31 of multivibrator 5 is conducting, so that tube 32 is correspondingly blocked. Assume further that tube 12 of the flip-flop circuit 9 has been left conducting so that tube 11 is non-conducting. Since multivibrator 5 is free-running, it will in due course flip over so that tube 32 abruptly conducts and tube 31 is abruptly blocked. The abrupt conduction of tube 32 applies a negative voltage to capacitor 45, which differentiates the voltage drop and applies it as a negative pulse to the grid of tube 62. In tube 62 the pulse is inverted and thence applied as a positive pulse to the grid of strobotron 47. Modulator 3, thus energized, applies a high power modulating pulse to projector 1 through cable 2. Crystal projector 53, thus shock excited, sends forth a pulse envelope of supersonic energy toward the surface of the waves. The high energy modulating pulse applied to projector 1 is also applied through capacitor 6 and receiver 7 to the grid 15 of tube 12. Such a pulse, however, being positive in nature, has no effect on the flip-flop circuit since tube 12 is already conducting.

A predetermined time after generation of the transmission pulse, the multivibrator 5 flips back, so that tube 31 is abruptly rendered conductive and tube 32 is abruptly blocked. Conduction of tube 31 results in a negative wave front which is differentiated in capacitor 46 and applied as a negative pulse to the grid of buffer tube 63, which inverts it and applies it as a positive pulse to the grid 14 of tube 11. This renders tube 11 abruptly conductive, the conduction thereof abruptly cutting off tube 12 by pulling the plate voltage down through capacitor 13 in the known manner of flip-flop circuits. Conduction of tube 11, thus initiated, is indicated in ammeter 16.

Ammeter 16 continues to receive a substantially constant current from the plate source $B_3$ until the returning echo pulse is received in crystal projector 53 and applied to receiver 7 through capacitor 6. Receiver 7 applies the echo as a positive pulse through capacitor 64 to the grid 15 of tube 12. This renders tube 12 conducting and blocks tube 11 to stop conduction in the ammeter 16.

A complete cycle of operation has thus been completed and the apparatus has returned to the condition assumed at the start of this description.

The current in ammeter 16 is averaged out by the action of the capacitor 17, so that its magnitude thus becomes a direct measure of the percentage time during which tube 11 is conducting. This time is in turn a measure of the time interval between the delayed pulse from multivibrator 5 and the returning echo from receiver 7. In this manner the rise and fall of water surface due to waves, which constitutes but a negligible percentage change in the total water depth, may be caused to create a large percentage change in the reading of ammeter 16. The pulse repetition rate is so high compared to the fluctuation rate of the waves that a substantially continuous indication of wave motion is obtained. By employing gas filled tubes to energize the ammeter, it is possible to use a relatively insensitive and correspondingly rugged recording instrument for ammeter 16.

As stated hereinbefore, the multivibrator periodicity, as fixed by the setting of potentiometer 37, is determined by the maximum water depth. The time sharing between tubes 31 and 32 of multivibrator 5, which is fixed by the setting of resistor 38, is determined by the magnitude of surface fluctuation due to waves. For maximum precision it is desirable to delay the flip back of multivibrator 5 as long as possible before reception of the earliest echo, so that maximum ammeter fluctuation for a given water surface fluctuation is obtained.

When the apparatus is used in shallow depths (less than 30 feet), it has been found advisable to employ a separate hydrophone-receiver 70 connected directly to the primary winding of transformer 56 by the lead 71 shown.

It will be understood that this invention may be constructed and utilized in any suitable arrangement depending upon the specific conditions to be met and that various modifications and changes may be made in this invention without departing from the spirit and scope thereof as set forth in the appended claims. It has been found that a suitable circuit may be constructed having the following principal parameters:

Receiver 7, U. S. Navy Q. B. E. receiver
Tubes 11 and 12, 2050 thyratrons
Capacitor 13, 0.05 mfd.
Meter 16, 5 ma. Esterline Angus graphic recording meter
Capacitor 17, 200 mfd.
Screen bias 18, 9 volts
Resistors 19 and 21, 0.25 megohms
Resistors 22 and 23, 10,000 ohms
Tubes 31 and 32, 6N7 vacuum tubes
Capacitors 33 and 34, .025 mfd.
Potentiometer 37, 100,000 ohms
Potentiometer 38, 2 megohms
Resistors 41 and 42, 100,000 ohms
Resistors 43 and 44, 65,000 ohms
Capacitors 45 and 46, 0.005 mfd.
Tube 47, 631–P strobotron tube
Tube 51, General Radio Strobolux tube
Tubes 62 and 63, 6N7 vacuum tubes
Capacitor 64, 0.0001 mfd.
$B_1$, 150 volts D. C. regulated
$B_2$ and $B_3$, 350 volts D. C. regulated The invention described herein may be manufactured and used by or for the Government of the United States of America for governmental purposes without the payment of any royalties thereon or therefor.

What is claimed is:

1. Echo ranging apparatus for indicating wave undulations in a body of water, comprising a multivibrator having two output terminals and being effective to generate a square wave, with a rising voltage appearing on one said terminal simultaneously with a dropping voltage on the other said terminal and vice-versa, one of said voltages constituting a transmitting vibration, the other a non-transmitting vibration, a pulse projector adapted to be lowered to the bed of the body of water, cable means connecting said projector to the first of said terminals and effective to transmit echo ranging pulses in response to transmitting vibrations, a receiver connected to said cable means for receiving echoes of said pulses, and a measuring circuit connected to the second of said terminals and to said receiver and effective to measure the time interval between the non-pulse-transmitting vibrations of said multivibrator and the reception of the pulse echoes.

2. Echo ranging apparatus for indicating wave undulations in a body of water, comprising a multivibrator having two output terminals and being effective to generate a square wave, with a rising voltage appearing on one said terminal simultaneously with a dropping voltage on the other said terminal and vice versa, one of said voltages constituting a transmitting vibration, the other a non-transmitting vibration, a pulse projector adapted to be lowered to the bed of the body of water, cable means connecting said projector to the first of said terminals and effective to transmit echo ranging pulses in response to transmitting vibrations, a receiver connected to said cable means for receiving echoes of said pulses, a tube connected to the second of said terminals to be rendered conductive in response to the non-pulse-transmitting vibrations of said multivibrator, and connected to be rendered non-conductive in response to return of the pulse echoes to said receiver, and measuring means connected in circuit with said tube effective to indicate when said tube is conducting.

3. Echo ranging apparatus for indicating wave undulations in a body of water, comprising a multivibrator having two output terminals and being effective to generate a square wave of voltage, with a rising voltage appearing on one said terminal simultaneously with a dropping voltage on the other said terminal and vice versa, a pulse projector adapted to be lowered to the bed of the body of water, cable means connecting said projector to the first of said terminals and effective to transmit echo ranging pulses, a receiver connected to said cable means for receiving echoes of said pulses, a flip-flop circuit including a pair of gas-filled tubes so connected that initiation of conduction in one tube blocks conduction in the other tube and vice versa, each of said gas-filled tubes having a control grid by which conduction can be initiated, circuit means connecting the second of said terminals to the grid of the first of said gas-filled tubes whereby conduction in said first gas-filled tube is initiated in response to the non-pulse-transmitting vibrations of said multivibrator, circuit means connecting said receiver and the grid of the second of said gas-filled tubes whereby conduction in said second gas-filled tube is initiated in response to reception of the echo pulses and conduction in said first gas-filled tube is thereby blocked, and an ammeter in series with said first gas-filled tube for indicating when said first gas-filled tube is conducting.

4. Echo ranging apparatus for indicating wave undulations in a body of water, comprising a multi-vibrator having two output terminals and being effective to generate voltage waves of two types, one of said types being a pulse-transmitting vibration, the other type being a non-pulse-transmitting vibration having a predetermined time lag relative to the first vibration, an underwater pulse projector connected to the first of said terminals to receive transmitting vibrations therefrom and to transmit echo ranging pulses, a receiver connected to the projector to receive echoes of said pulses, a flip-flop circuit connected to the second of said terminals and to the receiver and having an element rendered conductive by said non-transmitting vibrations and rendered non-conductive by return of the pulse echoes to said receiver, and measuring means connected in circuit with said element to measure the time interval between the non-transmitting vibrations and the reception of the pulse echoes.

LEIGHTON L. MORSE.

REFERENCES CITED

The following references are of record in the file of this patent:

UNITED STATES PATENTS

| Number | Name | Date |
|---|---|---|
| 1,217,585 | Fessenden | Feb. 27, 1917 |
| 1,739,901 | Grimes | Dec. 17, 1929 |
| 2,112,541 | Morton | Mar. 29, 1938 |
| 2,131,993 | Wittkuhns et al. | Oct. 4, 1938 |
| 2,247,662 | Newhouse | July 1, 1941 |
| 2,301,196 | Bradford | Nov. 10, 1942 |
| 2,346,093 | Tolson | Apr. 4, 1944 |
| 2,412,631 | Rice | Dec. 17, 1946 |
| 2,416,333 | Lehmann | Feb. 25, 1947 |
| 2,422,337 | Chilowsky | June 17, 1947 |
| 2,426,216 | Hight | Aug. 26, 1947 |
| 2,433,332 | Benioff | Dec. 30, 1947 |
| 2,433,385 | Miller | Dec. 30, 1947 |
| 2,460,316 | Trent | Feb. 1, 1949 |